United States Patent
Nuggehalli

(10) Patent No.: US 7,475,133 B2
(45) Date of Patent: Jan. 6, 2009

(54) METHOD FOR CONFIGURING A MONITORING SYSTEM TO MONITOR SELECTED NETWORK ELEMENTS

(75) Inventor: Jayasimha Nuggehalli, Union City, CA (US)

(73) Assignee: Ricoh Company, Ltd, Ohta-ku Tokyo (JP)

( * ) Notice: Subject to any disclaimer, the term of this patent is extended or adjusted under 35 U.S.C. 154(b) by 949 days.

(21) Appl. No.: 10/340,264

(22) Filed: Jan. 9, 2003

(65) Prior Publication Data

US 2004/0199626 A1    Oct. 7, 2004

(51) Int. Cl.
*G06F 15/173* (2006.01)

(52) U.S. Cl. .................. 709/224; 709/223; 709/226; 709/246

(58) Field of Classification Search ............... 709/224, 709/223, 226, 246
See application file for complete search history.

(56) References Cited

U.S. PATENT DOCUMENTS

| | | | |
|---|---|---|---|
| 6,061,723 A * | 5/2000 | Walker et al. | 709/224 |
| 6,286,047 B1 * | 9/2001 | Ramanathan et al. | 709/224 |
| 6,374,293 B1 | 4/2002 | Dev et al. | |
| 6,397,248 B1 * | 5/2002 | Iyer | 709/223 |
| 7,024,476 B1 * | 4/2006 | Page et al. | 709/224 |
| 7,240,106 B2 * | 7/2007 | Cochran et al. | 709/222 |
| 2004/0006620 A1 * | 1/2004 | Howard et al. | 709/224 |
| 2005/0157654 A1 * | 7/2005 | Farrell et al. | 370/241 |

OTHER PUBLICATIONS

Stergiou, C., European Search Report, EP 04 25 4085, Nov. 10, 2004, 2 pages.

* cited by examiner

*Primary Examiner*—Ario Etienne
*Assistant Examiner*—Sahera Halim
(74) *Attorney, Agent, or Firm*—Hickman Palermo Truong & Becker LLP; Christian A. Nicholes

(57) ABSTRACT

According to one aspect of the invention, a method is provided for configuring a monitoring system to monitor selected network elements. According to the method, one or more network elements on a network are automatically discovered. Identification data that identify each of the one or more network elements are generated. A modified version of the identification data is generated in response to user input. Each network element that is identified in the modified version of the identification data is monitored.

20 Claims, 3 Drawing Sheets

METHOD FOR CONFIGURING A MONITORING SYSTEM TO MONITOR SELECTED NETWORK ELEMENTS

FIELD OF THE INVENTION

The invention relates to device monitoring systems, and more specifically, to a method for configuring a monitoring system to monitor selected network elements.

BACKGROUND OF THE INVENTION

Multiple network elements may be communicatively coupled to a computer network such as a local area network (LAN). These network elements may include computers, printers, copy machines, scanners, fax machines, and other devices. Each network element may possess a set of characteristics, or properties, that currently describe the network element. Such properties may include information about a current status of a network element.

For example, a printer's status might describe whether the printer is powered on or off. A printer's status might describe whether the printer is in use, ready, jammed, or out of toner. A printer's status might describe how many pages that the printer has printed. Such status information may be useful for management, support, or billing purposes.

To automatically obtain status information for network elements on a network, a monitoring mechanism may be implemented. A monitoring mechanism monitors each network element that is contained in a list of network elements. The monitoring mechanism may receive status information that is provided periodically by network elements or by actively polling network elements for status information. In response to polling, each polled network element returns current status information to the monitoring mechanism. A user may obtain the status information that has been gathered by the monitoring mechanism.

The list of network elements may be manually generated or automatically generated through an automatic discovery mechanism. An automatic discovery mechanism automatically searches a network for all network elements that are connected to the network. The automatic discovery mechanism adds to the list all network elements that respond to the search. The automatic discovery mechanism makes no determination about whether to exclude a particular network element from the list. The automatic discovery mechanism does not add to the list any network element that does not respond to the search. As a result, network elements that are not configured to respond to the search are not added to the list, and, consequently, are not polled thereafter by a monitoring mechanism.

Because the automatic discovery mechanism makes no determination about whether to exclude a particular network element from the list, a monitoring mechanism monitors all of the network devices that the automatic discovery mechanism discovers on a network. In a network to which many network elements are connected and in which polling is performed frequently, this may result in a significant increase in network traffic and degradation in network performance. Moreover, a user who is interested in viewing status information for only a select few network elements may be overwhelmed by the potentially voluminous status information through which he must search to obtain the information in which he is actually interested. For example, a particular vendor may wish to obtain status information for devices that are made by the particular vendor.

Because the automatic discovery mechanism does not add to the list any network element that does not respond to the search, a monitoring mechanism may fail to gather status information for one or more network elements for which a user is interested in obtaining status information. Furthermore, there may exist some useful information, about automatically discovered network elements, that the automatic discovery mechanism cannot automatically discover. For example, if a network element is not configured to store information about its own location, then the automatic discovery mechanism is unable to obtain location information about the network element. A user may have difficulty recognizing a particular network element based only on information that can be automatically discovered.

Based on the need to selectively obtain useful information about network elements that are of interest to a user, a method for configuring a monitoring system to monitor selected network elements is highly desirable.

SUMMARY OF THE INVENTION

According to one aspect of the invention, a method is provided for configuring a monitoring system to monitor selected network elements. According to the method, one or more network elements on a network are automatically discovered. Identification data that identify each of the one or more network elements are generated. A modified version of the identification data is generated in response to user input. Each network element that is identified in the modified version of the identification data is monitored.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

Figure 1:
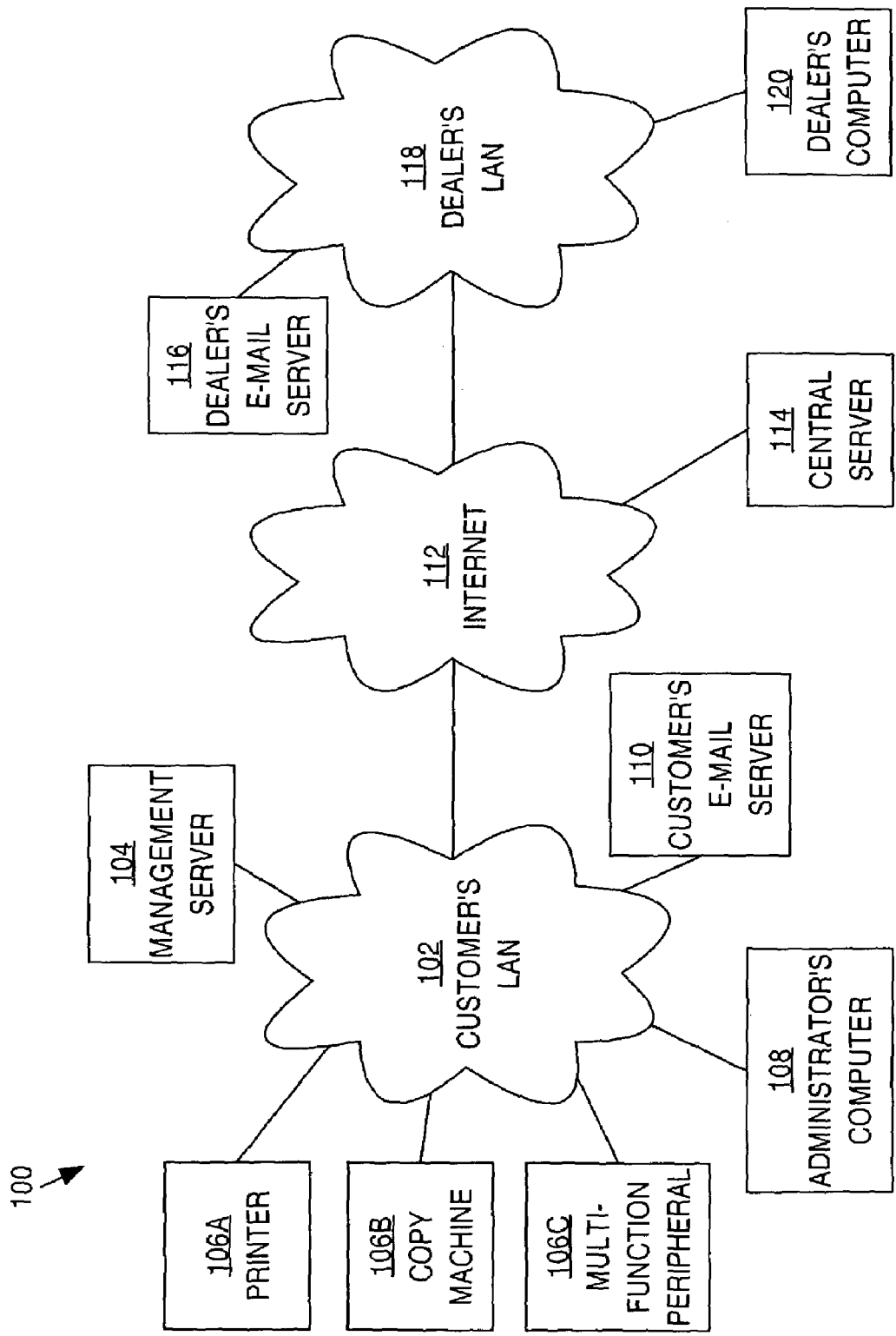
FIG. 1 is a block diagram that depicts a system 100 that may be configured to monitor selected network elements.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

Network elements on a network are automatically discovered. All of the network elements that are connected to a particular subnet of the network may be automatically discovered. The network elements may be any type of devices. Example devices include, without limitation, rasterizing and/or or printing devices, such as multi-function peripherals (MFPs).

Identification data that identifies each of the network elements is generated. A hypertext markup language (HTML) Web page that contains the identification data may be generated. The identification data may be transmitted, for example, in the form of the HTML Web page, to a remote computer that may represent the HTML Web page within an Internet browser application.

A modified version of the identification data is generated in response to user input. The user input may be received from the remote computer via the Internet browser application. The modified version of the identification data may identify fewer of the network elements than were identified in the originally generated identification data. The modified version of the identification data may include information, about the network elements, that an automatic discovery mechanism is not configured to automatically discover.

An HTML Web page that contains the modified version of the identification data may be generated. The HTML Web page may be transmitted to the remote computer, which may represent the HTML Web page within the Internet browser application.

Each network element that is identified in the modified version of the identification data is monitored. Through the monitoring, status information about each network element that is identified in the modified version of the identification data may be gathered. The status information may be transmitted to a remote server. The status information may be transmitted at one or more specified times. The status information may be transmitted in response to a signal that is received from the remote computer through the Internet browser application.

The remote server may send the status information to users. Because the status information excludes information about network elements that are not contained in the modified version of the identification data, the users are not burdened by data in which they are not interested, and bandwidth is not wasted transferring data that is not of interest to the users. The status information may contain information, determined from the modified version of the identification data, which could not be automatically discovered. Such information may assist the users in identifying a particular network element. Because the modified version of the identification data is derived from automatically discovered data, a user does not need to construct such data from scratch.

A System for Monitoring Selected Network Elements

FIG. 1 is a block diagram that depicts a system 100 that may be configured to monitor selected network elements. The system includes a customer's LAN 102, a management server 104, a printer 106A, a copy machine 106B, a multi-function peripheral 106C, an administrator's computer 108, a customer's e-mail server 110, the Internet 112, a central server 114, a dealer's e-mail server 116, a dealer's LAN 118, and a dealer's computer 120. Printer 106A, copy machine 106B, and multi-function peripheral 106C are collectively referred to herein as network elements 106A-106C. The system illustrated is but one example of such a system, and other such systems may include more or fewer components than those illustrated.

Management server 104, network elements 106A-106C, administrator's computer 108, and customer's e-mail server 110 are communicatively coupled to customer's LAN 102. Customer's LAN 102, central server 114, and dealer's LAN 118 are communicatively coupled to Internet 112. Dealer's e-mail server 116 and dealer's computer 120 are communicatively coupled to dealer's LAN 118.

Management server 104 may be located remotely from administrator's computer 108 and central server 114. While administrator's computer 108 is shown communicatively coupled to customer's LAN 102, administrator's computer 108 may be communicatively coupled to Internet 112 instead. Alternatively, administrator's computer 108 may be connected directly to management server 104. Thus, administrator's computer 108 does not need to be connected directly to customer's LAN 102 to communicate with management server 104.

Management server 104 is configured to automatically discover network elements 106A-106C. Management server 104 is further configured to generate identification data that identifies each of network elements 106A-106C and to generate a modified version of the identification data in response to user input from administrator's computer 108. Management server 104 is also configured to monitor each network element that is identified in the modified version of the identification data.

In one embodiment of the invention, management server 104 is configured to execute a Web server application. Management server 104 is also configured to organize the identification data according to a specified format. Management server 104 is further configured to generate an HTML Web page that contains the identification data that the management server automatically discovered. Management server 104 is also configured to transmit the HTML Web page to administrator's computer 108 using hypertext transfer protocol (HTTP). Management server 104 may be configured to upload the identification data to administrator's computer 108 using file transfer protocol (FTP).

In one embodiment of the invention, the identification data are organized according to the format "<IP address>=<subnet mask>, <serial number>" where "<IP address>" is the Internet Protocol address of an automatically discovered network element, "<subnet mask>" identifies a particular subnet on which the automatically discovered network element exists, and "<serial number>" is a serial number of the automatically discovered element. For example, the identification data might contain an entry that reads "172.30.2.225=255.255.255.0,00.00.aa.5b.65.af".

In one embodiment of the invention, management server 104 is configured to download the modified version of the identification data from administrator's computer 108 using FTP. Management server 104 may be configured to generate an HTML Web page that contains the modified version of the identification data and transmit the HTML Web page to administrator's computer 108 using HTTP.

In one embodiment of the invention, each entry in the modified version of the identification data is organized according to the format "<IP address>=<subnet mask>, <serial number>, <additional ID>, <comment>" where "<additional ID>" and "<comment>" are information that management server 104 is not configured to automatically discover. For example, the identification data might contain an entry that reads "172.30.2.225=255.255.255.0, 00.00.aa.5b.65.af, 12345, OSD B&W Printer".

In one embodiment of the invention, management server 104 is configured to automatically obtain status information for each of network elements 106A-106C that is identified in the modified version of the identification data. Management server 104 may be configured to automatically obtain the status information via a polling mechanism. According to one embodiment of the invention, management server 104 is configured to format the status information as an extensible markup language (XML) page.

In one embodiment of the invention, management server 104 is configured to generate e-mail that contains the status information. Management server 104 addresses the e-mail to central server 114 and transmits the e-mail through customer's LAN 102 to customer's e-mail server 110. Management server 104 may be configured to generate and transmit the e-mail at one or more specified times, e.g., times of day, or at any time in response to receiving a signal from administrator's computer 108.

In one embodiment of the invention, each of network elements 106A-106C includes a rasterizing mechanism, a printing mechanism, or both. One or more of network elements 106A-106C may be on a particular subnet of customer's LAN 102. One or more of network elements 106A-106C may be configured to respond to an automatic discovery mechanism's search and supply status information to management server 104 in response to being polled by management server 104.

In one embodiment of the invention, administrator's computer 108 is configured to execute an Internet browser application such as Microsoft Internet Explorer or Netscape Navigator. Administrator's computer 108 may be configured to receive HTML Web pages and display the HTML Web pages via the Internet browser application. Administrator's computer 108 may be configured to download from management server 104, via the Internet browser application, the identification data that identifies the network elements that the management server automatically discovered.

In one embodiment of the invention, administrator's computer 108 is configured to execute a text editing application such as Microsoft Notepad to enable a user to generate a modified version of the identification data using the text editing application. The modified version of the identification data may be uploaded, via the Internet browser application, to management server 104. Administrator's computer 108 may be configured to receive the HTML Web page and display the HTML Web page via the Internet browser application.

In one embodiment of the invention, customer's e-mail server 110 is configured to receive e-mail, which contains status information about each of the network elements identified in a modified version of the identification data, from management server 104 through customer's LAN 102. Customer's e-mail server 110 sends the e-mail through Internet 112 to central server 114.

In one embodiment of the invention, central server 114 is configured to maintain a database and receive e-mail through Internet 112. Central server 114 stores status information, which is contained in the email, in the database. Central server 114 also transmits, to dealer's e-mail server 116, status information about each network element that is identified in the modified version of the identification data. For example, central server 114 may transmit the status information in e-mail through Internet 112. Alternatively, central server 114 may transmit the status information to dealer's computer 120 using FTP.

In one embodiment of the invention, dealer's e-mail server 116 is configured to receive, through Internet 112, e-mail that contains status information about each of the network elements identified in the modified version of the identification data. Dealer's e-mail server 116 is also configured to upload the e-mail to dealer's computer 120 through dealer's LAN 118.

In one embodiment of the invention, dealer's computer 120 is configured to execute an e-mail application such as Microsoft Outlook. Dealer's computer 120 downloads e-mail that contains status information about each of the network elements identified in the modified version of the identification data. Dealer's computer 120 may download the e-mail from dealer's e-mail server 116 through dealer's LAN 118. Alternatively, dealer's computer 120 may download the status information from central server 114 using FTP.

Figure 2:
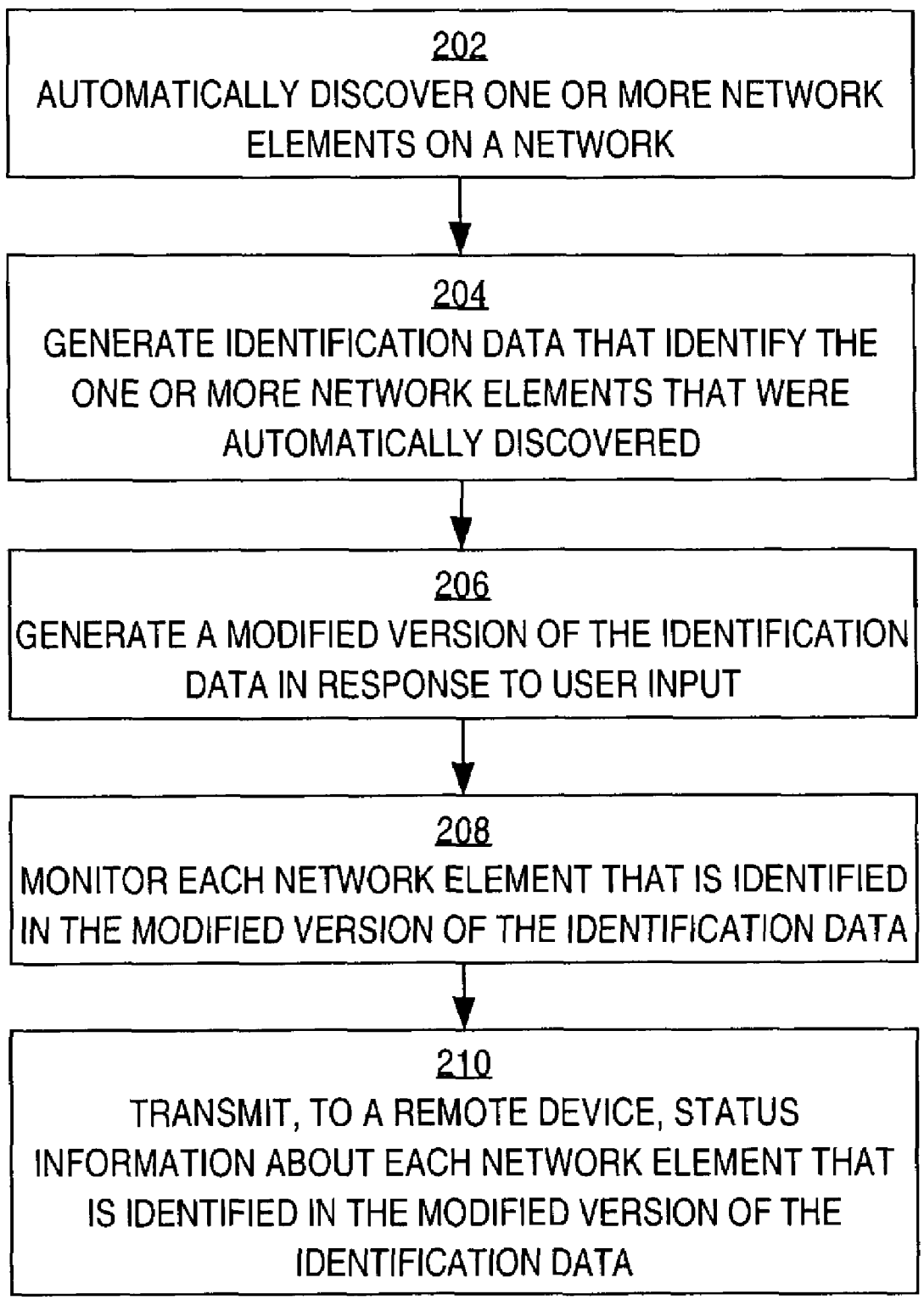
FIG. 2 is a flow diagram that depicts a technique for configuring a monitoring system to monitor only selected network elements, according to one embodiment of the invention.

A Technique for Configuring a Monitoring System to Monitor Selected Network Elements FIG. 2 is a flow diagram that depicts a technique for configuring a monitoring system to monitor only selected network elements, according to one embodiment of the invention. The technique may be performed relative to the system that is illustrated in FIG. 1. Alternatively, the technique may be performed relative to other systems that differ from the system that is illustrated in FIG. 1.

In block 202, one or more network elements on a network are automatically discovered. For example, management server 104 may automatically discover network elements 106A-106C.

In block 204, identification data, which identify the one or more network elements that were automatically discovered, are generated. For example, management server 104 may generate identification data that identify network elements 106A-106C.

In block 206, a modified version of the identification data is generated in response to user input. For example, administrator's computer 108 may download the original identification data from management server 104. A user of administrator's computer 108 may edit the original identification data, possibly using a text editing application, to generate a modified version of the identification data. The modified version of the identification data may exclude one or more network elements that were identified in the original identification data. The modified version of the identification data may contain information that management server 104 did not automatically discover. The modified version of the identification data may contain one or more network elements that were not identified in the original identification data.

For example, a user might edit the identification data to identify only network elements 106B-106C and not printer 106A (because a dealer might not be interested in receiving status information for printer 106A). A user might edit the identification data to contain user-friendly names, which management server 104 might not be configured to automatically discover, for network elements 106B-106C. The user might also add attributes of network elements 106B-106C that are not discoverable by management server 104. For example, the user might add to the identification data a manufacturer's serial number for copy machine 106B, that otherwise would not have been discoverable by management server 104.

In block 208, each network element that is identified in the modified version of the identification data is monitored. For example, administrator's computer 108 uploads the modified version of the identification data to management server 104. Management server 104 monitors network elements 106B-106C, and not printer 106A, because network elements 106B-106C are identified in the modified version of the identification data and printer 106A is not.

In block 210, status information about each network element that is identified in the modified version of the identification data is transmitted to a remote device. For example, management server 104 may send an e-mail, which is addressed to central server 114, to customer's e-mail server 110. In one embodiment of the invention, the e-mail may also be addressed to a dealer's e-mail account. The e-mail might contain status information for network elements 106B-106C, and not printer 106A, because network elements 106B-106C are identified in the modified version of the identification data and printer 106A is not. Customer's e-mail server 110 sends the e-mail to central server 114 through Internet 112.

In one embodiment of the invention, the network elements that are automatically discovered are devices that contain a printing mechanism, a rasterizing mechanism, or both. For example, printer 106A contains a printing mechanism, and copy machine 106B and multi-function peripheral 106C each contain both a rasterizing mechanism and a printing mechanism. Therefore, all of network elements 106A-106C may be automatically discovered. In one embodiment of the invention, all of the network elements that are on a particular subnet are automatically discovered.

In one embodiment of the invention, the identification data that identify the one or more network elements that were automatically discovered are transmitted to a remote device that is configured to represent the identification data within an Internet browser application. For example, a user of administrator's computer 108 may direct an Internet browser application to a first HTML Web page that is generated by management server 104. In response to a request by the Internet browser application, management server 104 may transmit the first HTML Web page to administrator's computer 108. The first HTML Web page may contain the identification data. Thus, a user may use the Internet browser application to view the network elements that are currently being monitored. Based on this information, the user may determine whether to edit the identification data.

The first HTML Web page may also contain a control, such as a button, that a user may activate in order to cause the Internet browser application to download the identification data from management server 104. In one embodiment of the invention, the user may specify a file to which the Internet browser application should store the identification data on administrator's computer 108.

In one embodiment of the invention, the first HTML Web page may also contain a control, such as a button, that a user may activate in order to cause the Internet browser application to upload the modified version of the identification data to management server 104. In one embodiment of the invention, the user may specify a file on administrator's computer 108 from which the Internet browser application should upload the modified version of the identification data.

In one embodiment of the invention, the modified version of the identification data is transmitted to a remote device that is configured to represent the HTML Web page within an Internet browser application. For example, in response to receiving the modified version of the identification data from administrator's computer 108, management server 104 may generate a second HTML Web page. The second HTML Web page may contain the modified version of the identification data. The second HTML Web page may contain a statement that the transmission of the modified version was successful. Management server 104 may return the second HTML Web page to the Internet browser application executing on administrator's computer 108. Thus, a user may verify through the Internet browser application that management server 104 received the modified version of the identification data.

In one embodiment of the invention, status information about each network element that is identified in the modified version of the identification data is transmitted to a remote device at one or more specified times. For example, management server 104 may send e-mail to central server 114 at multiple times of day that are specified by a user.

In one embodiment of the invention, status information about each network element that is identified in the modified version of the identification data is transmitted to a first remote device in response to receiving a signal from a second remote device. For example, management server 104 may send e-mail to central server 114 in response to receiving a signal from administrator's computer 108. The signal may be sent in response to a user activating a control in an HTML Web page through an Internet browser application executing on administrator's computer 108. Thus, a user may cause status information to be sent to central server 114 at any time.

While in one embodiment of the invention a modified version of the identification data may be generated remotely on administrator's computer 108 and uploaded to management server 104, in an alternative embodiment of the invention, the modified version of the identification information may be generated locally on management server 104.

Implementation Mechanisms

Figure 3:
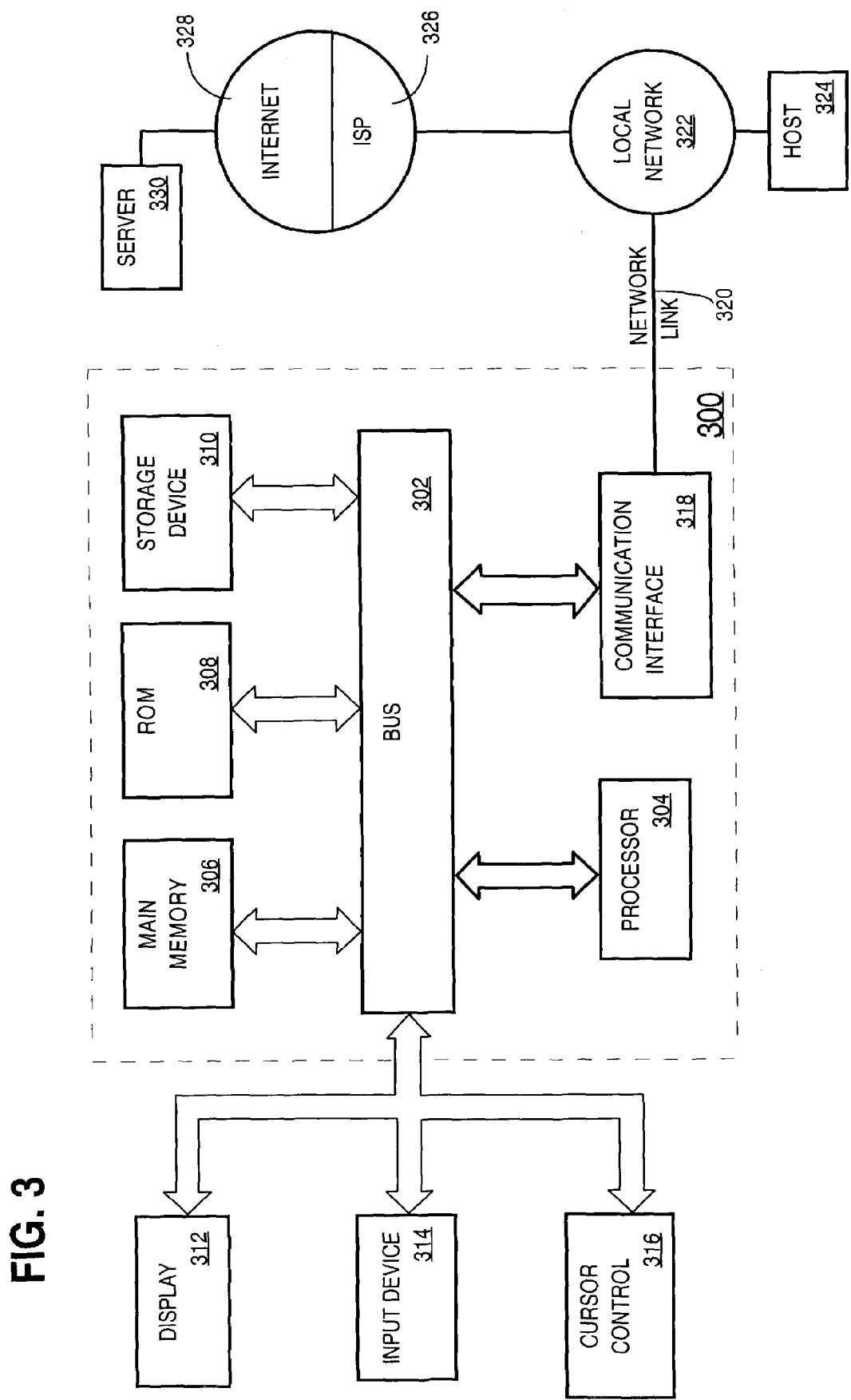
FIG. 3 is a block diagram that depicts a computer system upon which an embodiment of the invention may be implemented.

FIG. 3 is a block diagram that depicts a computer system upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions. Management server 104 may be implemented on computer system 300.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for configuring a monitoring system to monitor selected network elements. According to one embodiment of the invention, computer system 300 provides for configuring a monitoring system to monitor selected network elements in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments of the invention, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a LAN card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the Internet 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for configuring a monitoring system to monitor selected network elements as described herein. Processor 304 may execute the received code as it is received and/or stored in storage device 310 or other non-volatile storage for later execution. In this manner, computer system 300 may obtain application code in the form of a carrier wave.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A method to monitor selected network elements, the method comprising:
   a management server automatically discovering one or more network elements on a network;
   the management server generating a first version of identification data, the first version of identification data identifying each of the one or more network elements that was automatically discovered;
   the management server transmitting the first version of the identification data to a remote device over the network;
   upon receiving the first version of identification data at the remote device, the remote device modifying the first version of identification data based upon user input at the remote device to generate a modified version of identification data, the modified version of identification data identifying fewer or more network elements than identified in the first version of identification data;
   the remote device transmitting the modified version of identification data to the management server over the network;
   the management server receiving, from the remote device, over the network, the modified version of identification data; and
   the management server monitoring each network element identified in the modified version of identification data.

2. The method of claim 1, wherein the management server generating and transmitting the first version of identification data to the remote device further comprises:
   the management server generating an HTML Web page comprising the first version of identification data; and
   the management server transmitting the HTML Web page to the remote device.

3. The method of claim 2, wherein the HTML Web page additionally comprises a button control where the button control is activated by a user, causing an Internet browser application on the remote device to upload the modified version of identification data to the management server that transmitted the HTML Web page to the remote device.

4. The method of claim 1, further comprising:
   the management server generating an HTML Web page comprising the modified version of identification data; and
   the management server transmitting the HTML Web page to the remote device.

5. The method of claim 4, wherein the HTML Web page additionally contains a statement that the transmission of the modified version of identification data was successful.

6. The method of claim 1, further comprising the management server transmitting, to the remote device, status information about each network element identified in the modified version of identification data.

7. An apparatus to monitor selected network elements, the apparatus comprising a memory storing instructions which, when processed by one or more processors causes:
   the apparatus to automatically discover one or more network elements on a network;
   the apparatus to generate a first version of identification data, the first version of identification data identifying each of the one or more network elements automatically discovered;
   the apparatus to transmit the first version of identification data to a remote device over the network;
   upon receiving the first version of identification data at the remote device, the remote device modifying the first version of identification data based upon user input at the remote device to generate a modified version of identification data, the modified version identifying fewer or more network elements than identified in the first version of identification data;
   the remote device transmitting the modified version of identification data to the apparatus over the network;
   the apparatus to receive, from the remote device, over the network, a modified version of identification data, wherein the modified version was prepared at the remote device and identifies fewer or more network elements than identified in the first version of identification data; and
   the apparatus to monitor each network element identified in the modified version of identification data.

8. The apparatus of claim 7, wherein the one or more network elements are one or more devices, each of which includes one or more of a rasterizing mechanism and a printing mechanism.

9. The apparatus of claim 7, wherein automatically discovering one or more network elements comprises automatically discovering all network elements that are on a particular subnet on the network.

10. The apparatus of claim 7, wherein the modified version of identification data includes information about the one or more network elements that an automatic discovery mechanism is not configured to automatically discover.

11. The apparatus of claim 7, wherein the remote device is configured to represent the first version of identification data and the modified version of identification data in an HTML Web page within an Internet browser application.

12. The apparatus of claim 7, wherein the user input is received from the remote device via an Internet browser application.

13. The apparatus of claim 7, wherein said generating and said transmitting the first version of identification data to the remote device further comprise:
   generating an HTML Web page comprising the first version of identification data; and
   transmitting the HTML Web page to the remote device.

14. The apparatus of claim 13, wherein the HTML Web page additionally comprises a button control where the button control is activated by a user, causing an Internet browser application on the remote device to upload the modified version of identification data to the apparatus that transmitted the HTML Web page to the remote device.

15. The apparatus of claim 7, further comprising:
   the apparatus generating an HTML Web page comprising the modified version of identification data; and
   the apparatus transmitting the HTML Web page to the remote device.

16. The apparatus of claim 15, wherein the HTML Web page additionally contains a statement that the transmission of the modified version of identification data was successful.

17. The apparatus of claim 7, further comprising the apparatus transmitting, to the remote device, status information about each network element identified in the modified version of identification data.

18. The apparatus of claim 7, further comprising the apparatus transmitting, at one or more specified times to the remote device, status information about each network element identified in the modified version of identification data.

19. The apparatus of claim 7, further comprising transmitting, to a first remote device in response to receiving a signal from a second remote device, status information about each network element identified in the modified version of identification data.

20. An apparatus for configuring an information-processing device to monitor selected network elements, the apparatus comprising a memory storing instructions which, when processed by one or more processors causes:
   the apparatus to automatically discover one or more network elements on a network;
   the apparatus to generate a first version of identification data, the first version of identification data identifying each of the one or more network elements that was automatically discovered;
   the apparatus to generate an HTML Web page comprising the first version of identification data;
   the apparatus to transmit the HTML Web page to a remote device over the network;
   upon receiving the HTML Web page at the remote device, the remote device modifying the first version of identification data based upon user input at the remote device to generate a modified version of identification data, the modified version of identification data identifying fewer or more network elements than identified in the first version of identification data;
   the remote device transmitting the HTML Web page comprising the modified version of identification data to the apparatus over the network;
   the apparatus to receive, from the remote device, over the network, the HTML Web page comprising the modified version of identification data; and
   the apparatus to transmit, at one or more specified times to the remote device, status information about each network element identified in the modified version of identification data.

* * * * *